D. G. WADDELL.
NUT LOCK.
APPLICATION FILED NOV. 16, 1915.
1,201,896.   Patented Oct. 17, 1916.
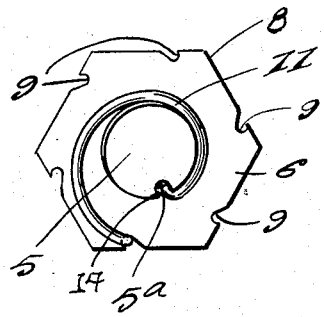
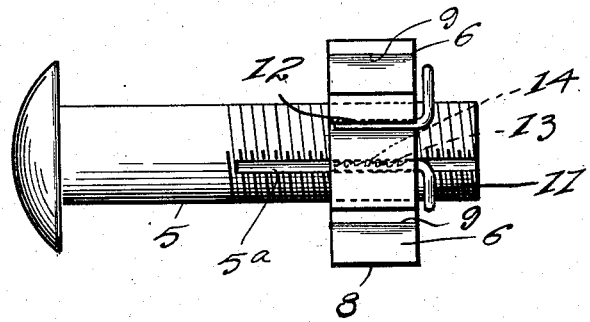
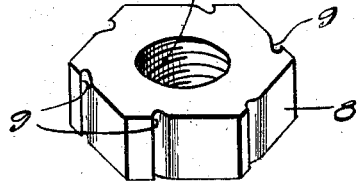
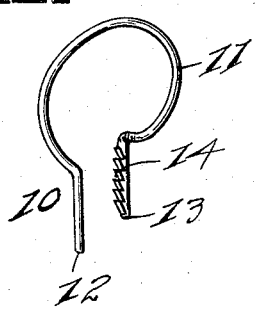
Witnesses
C. R. Beall
Carl Seebold
Inventor
D. G. Waddell
By _____ Attorney

UNITED STATES PATENT OFFICE.

DAVID G. WADDELL, OF NILES, OHIO.

NUT-LOCK.

1,201,896.  Specification of Letters Patent.  Patented Oct. 17, 1916.

Application filed November 16, 1915. Serial No. 61,804.

*To all whom it may concern:*

Be it known that I, DAVID GEORGE WADDELL, a citizen of the United States, residing at Niles, in the county of Trumbull and State of Ohio, have invented certain new and useful Improvements in Nut-Locks; and I do hereby declare the following to be a full, clear, and exact description of the invention, such as will enable others skilled in the art to which it appertains to make and use the same.

This invention has for its primary object to provide a simple and efficient nut lock embodying essentially a spring locking element having a substantially annular body and a pair of spaced angularly directed ends adapted to engage a slot formed in a bolt and grooves formed in the side faces of a nut to resiliently retain the latter in adjusted position upon the bolt.

Another object is the provision of means for reliably insuring against the accidental disengagement of the locking element from the bolt including a plurality of teeth formed upon the bolt-engaging end of the locking element and adapted to engage one wall of the slot in the bolt.

With these and other objects in view, the invention consists in the novel construction, arrangement and formation of parts as will be hereinafter specifically described, claimed and illustrated in the accompanying drawing, in which:

Figure 1 represents an end elevation of the improved nut lock applied to use, Fig. 2 represents a side elevation thereof, Fig. 3 represents a perspective view of the spring locking element removed, and Fig. 4 represents a perspective view of the nut removed.

Referring to the drawing in detail, wherein similar reference numerals indicate corresponding parts throughout the several views, the numeral 5 indicates the shank of a bolt of the usual or any preferred construction having external screw threads extending inwardly from one end thereof upon which is fitted a nut 6, having the usual internally screw threaded bore 7 and preferably being of hexagonal formation, as clearly illustrated in Figs. 1 and 4. The bolt 5 is formed with a longitudinal groove or slot 5ª extending inwardly from the threaded extremity thereof. Each of the side faces 8 of the nut is formed with a transverse recess 9 extending in alinement with the bore 7 thereof and adapted to receive the nut-engaging end of the spring locking element to be hereinafter described.

The spring locking element, designated generally by the numeral 10, is preferably formed of spring wire of adequate size and includes a substantially annular body 11 of adequate diameter to receive the bolt 5 and having angularly directed and parallel ends 12 and 13 adapted to engage in the grooves 5ª and 9 formed in the bolt and nut, respectively. The angular ends 12 and 13 of the spring locking element are disposed in parallel relation to the longitudinal axis of the annular body 11 so that when the locking element is properly positioned upon the nut and bolt the annular body 11 is disposed outwardly of the outer surface of the nut 6. The bolt-engaging end 13 of the spring locking element is formed with a plurality of ratchet teeth 14, having their pointed ends directed toward the annular body 11 and adapted to engage the internal screw threads of the nut to prevent accidental longitudinal movement of the end 13 with relation to the bolt.

In use, the nut 6 is advanced to the desired position upon the bolt 5 and the bolt-engaging end 13 of the spring locking element is slipped into the groove or slot 5ª. The nut-engaging end 12 is then pulled outwardly so as to expand the annular body 11 and is engaged in one of the grooves 9 in the nut 6. The tension of the annular body 11 and the spring locking element normally tends to rotate the nut 6 in a direction to advance it toward the object positioned upon the bolt 5 and reliably lock said nut against removal from the bolt.

What I claim is:

1. In a nut lock, a spring locking element including a curved body having angularly directed ends extended in parallel relation to the axis of the curved body, and a plurality of teeth formed upon one end of said body.

2. A nut lock including a bolt having a longitudinal slot, a nut fitted upon said bolt having a plurality of grooves formed in the side faces thereof, a spring locking element including a curved body encircling the outer extremity of said bolt and having angularly directed ends engaged with the bolt and nut, and a plurality of teeth formed upon the bolt-engaging end of said spring locking element and engaging the internal screw threads of said nut to lock said locking element against accidental removal from the bolt.

In testimony whereof I affix my signature in presence of two witnesses.

DAVID G. WADDELL.

Witnesses:
CHARLES W. BUTLER,
MARK HALFPENNY.